United States Patent
Bruce et al.

(10) Patent No.: US 6,686,060 B2
(45) Date of Patent: Feb. 3, 2004

(54) THERMAL BARRIER COATING MATERIAL

(75) Inventors: Robert William Bruce, Loveland, OH (US); Paul Gustav Klemens, Storrs, CT (US); Glen Alfred Slack, Scotia, NY (US)

(73) Assignee: General Electric Company, Schenectady, NY (US)

( * ) Notice: Subject to any disclaimer, the term of this patent is extended or adjusted under 35 U.S.C. 154(b) by 44 days.

(21) Appl. No.: 10/063,810

(22) Filed: May 15, 2002

(65) Prior Publication Data

US 2003/0215665 A1 Nov. 20, 2003

(51) Int. Cl.[7] .............................. B32B 15/04; F03B 3/12
(52) U.S. Cl. .................. 428/633; 428/632; 428/469; 428/670; 428/650; 428/697; 428/699; 428/701; 428/702; 416/241 B
(58) Field of Search ................... 428/633, 469, 428/680, 472, 670, 632, 650, 697, 699, 701, 702; 416/241 B; 501/102, 103, 134, 152

(56) References Cited

U.S. PATENT DOCUMENTS

| | | | |
|---|---|---|---|
| 4,753,902 A | * | 6/1988 | Ketcham |
| 4,774,150 A | | 9/1988 | Amano et al. |
| 5,981,088 A | * | 11/1999 | Bruce et al. |
| 6,025,078 A | | 2/2000 | Rickerby et al. |
| 6,117,560 A | | 9/2000 | Maloney |
| 6,352,788 B1 | | 3/2002 | Bruce |

FOREIGN PATENT DOCUMENTS

UA  2002010241  1/2002

OTHER PUBLICATIONS

U.S. patent application Ser. No. 09/833,446, Rigney et al., filed Apr. 12, 2001.

* cited by examiner

*Primary Examiner*—Deborah Jones
*Assistant Examiner*—Jennifer McNeil
(74) *Attorney, Agent, or Firm*—David L. Narciso; Gary M. Hartman; Domenica N. S. Hartman

(57) ABSTRACT

A coating material, particularly a thermal barrier coating, for a component intended for use in a hostile environment, such as the superalloy turbine, combustor and augmentor components of a gas turbine engine. The coating material is zirconia that is stabilized with yttria and to which an oxide additive of niobia or titania is alloyed to reduce and stabilize the thermal conductivity of the coating.

20 Claims, 1 Drawing Sheet

THERMAL BARRIER COATING MATERIAL

BACKGROUND OF INVENTION

1. Field of the Invention

This invention relates to thermal-insulating coatings for components exposed to high temperatures, such as the hostile thermal environment of a gas turbine engine. More particularly, this invention is directed to a thermal barrier coating (TBC) of yttria-stabilized zirconia (YSZ) and further alloyed with titania and/or niobia to decrease and stabilize the thermal conductivity of the TBC.

2. Description of the Related Art

Higher operating temperatures for gas turbine engines are continuously sought in order to increase their efficiency. However, as operating temperatures increase, the high temperature durability of the components within the hot gas path of the engine must correspondingly increase. Significant advances in high temperature capabilities have been achieved through the formulation of nickel and cobalt-base superalloys. Nonetheless, when used to form components of the turbine, combustor and augmentor sections of a gas turbine engine, such alloys alone are often susceptible to damage by oxidation and hot corrosion attack, and as a result may not retain adequate mechanical properties. For this reason, these components are often protected by a thermal barrier coating (TBC) system. TBC systems typically include an environmentally-protective bond coat and a thermal-insulating topcoat, typically referred to as the TBC. Bond coat materials widely used in TBC systems include, oxidation-resistant overlay coatings such as MCrAlX (where M is iron, cobalt and/or nickel, and X is yttrium or another rare earth or reactive element), and oxidation-resistant diffusion coatings such as diffusion aluminides that contain nickel-aluminum (NiAl) intermetallics.

Zirconia ($ZrO_2$) that is partially or fully stabilized by yttria ($Y_2O_3$), magnesia (MgO) or another alkaline-earth metal oxide, ceria ($CeO_2$) or another rare-earth metal oxide, or mixtures of these oxides has been employed as a TBC material. Binary yttria-stabilized zirconia (YSZ) has particularly found wide use as the TBC material on gas turbine engine components because of its low thermal conductivity, high temperature capability including desirable thermal cycle fatigue properties, and relative ease of deposition by plasma spraying, flame spraying and physical vapor deposition (PVD) techniques such as electron beam physical vapor deposition (EBPVD). TBC's employed in the highest temperature regions of gas turbine engines are often deposited by PVD, particularly EBPVD, which yields a strain-tolerant columnar grain structure that is able to expand and contract without causing damaging stresses that lead to spallation. Similar columnar microstructures can be produced using other atomic and molecular vapor processes, such as sputtering (e.g., high and low pressure, standard or collimated plume), ion plasma deposition, and all forms of melting and evaporation deposition processes (e.g., cathodic arc, laser melting, etc.). In contrast, plasma spraying techniques such as air plasma spraying (APS) deposit TBC material in the form of molten splats, resulting in a TBC characterized by a degree of inhomogeneity and porosity.

As is known in the art, zirconia is stabilized with the above-noted oxides to inhibit a tetragonal to monoclinic phase transformation at about 1000° C., which results in a volume expansion that can cause spallation. At room temperature, the more stable tetragonal phase is obtained and the undesirable monoclinic phase is minimized if zirconia is stabilized by at least about six weight percent yttria. An yttria content of seventeen weight percent or more ensures a fully stable cubic phase. Though thermal conductivity of YSZ decreases with increasing yttria content, the conventional practice has been to stabilize zirconia with at least six weight percent, and more typically to only partially stabilize zirconia with six to eight weight percent yttria (6–8% YSZ). Limited exceptions have generally included plasma-sprayed zirconia said to be stabilized by mixtures of yttria, magnesia, calcia or ceria, to which certain oxides may be added at specified levels to obtain a desired effect. For example, according to U.S. Pat. No. 4,774,150 to Amano et al., $Bi_2O_3$, $TiO_2$, $Tb_4O_7$, $Eu_2O_3$ and/or $Sm_2O_3$ may be added to certain layers of a TBC formed of zirconia stabilized by yttria, magnesia or calcia, for the purpose of serving as luminous activators.

Contrary to the conventional practice of stabilizing zirconia with at least six weight percent yttria, U.S. Pat. No. 5,981,088 to Bruce et al. unexpectedly showed that if a YSZ coating has a columnar grain structure (e.g., deposited by EBPVD), superior spallation resistance can be achieved if zirconia is partially stabilized by less than six weight percent yttria. Significantly, YSZ TBC's in accordance with Bruce et al. contain the monoclinic phase, which was intentionally avoided in the prior art by the six to eight weight percent yttria.

Commonly-assigned U.S. patent application Ser. No. 09/833,446 to Rigney et al. discloses a TBC of zirconia partially stabilized with yttria, preferably not more than three weight percent yttria (3% YSZ), to which one or more additional metal oxides having an ion size difference relative to zirconium ions ($Zr^{4+}$) are alloyed to reduce, and stabilize the thermal conductivity of the TBC. The additional metal oxides are disclosed as being limited to the alkaline-earth metal oxides magnesia (MgO), calcia (CaO), strontia (SrO) and barium oxide (BaO), the rare-earth metal oxides lanthana ($La_2O_3$), ceria ($CeO_2$) neodymia ($Nd_2O_3$), gadolinium oxide ($Gd_2O_3$) and dysprosia ($Dy_2O_3$) as well as such metal oxides as nickel oxide (NiO), ferric oxide ($Fe_2O_3$), cobaltous oxide (CoO), and scandium oxide ($Sc_2O_3$). Rigney et al. teaches that the required degree of crystallographic defects and/or lattice strain excludes such oxides as hafnia ($HfO_2$), titania ($TiO_2$), tantala ($Ta_2O_5$), niobia ($Nb_2O_5$), erbia ($Er_2O_3$) and ytterbia ($Yb_2O_3$), as well as others.

Though both Bruce et al. and Rigney et al. provide important advancements in the TBC material technology, it can be appreciated that it would be desirable if still other compositions were available for forming TBC's capable of exhibiting lower and thermally-stable thermal conductivities. Such TBC materials should also exhibit desirable erosion, impact and spallation resistance, particularly as TBC's are employed on components intended for more demanding engine designs.

SUMMARY OF INVENTION

The present invention generally provides a coating material, particularly a thermal barrier coating (TBC), for a component intended for use in a hostile environment, such as the superalloy turbine, combustor and augmentor components of a gas turbine engine. The coating material is zirconia that is stabilized with yttria, preferably at least three weight percent up to about ten weight percent yttria, and to which an oxide additive of niobia or titania is alloyed to reduce the thermal conductivity of the coating. Improvements obtained by this invention are particularly evident with limited additions of these oxide additives, preferably not more than ten weight percent.

As a result of exhibiting greater resistance to heat transfer, YSZ TBC's in accordance with this invention enable gas turbine engine components to be designed for thinner TBC and/or, where applicable, lower cooling air flow rates, which reduces processing and material costs and promotes component life and engine efficiency. TBC coatings in accordance with the invention also appear to be more thermally stable than unalloyed YSZ, in that their thermal conductivities remain relatively stable and do not increase significantly in comparison to 7% YSZ of the prior art.

Other objects and advantages of this invention will be better appreciated from the following detailed description.

DETAILED DESCRIPTION

Figure 1:
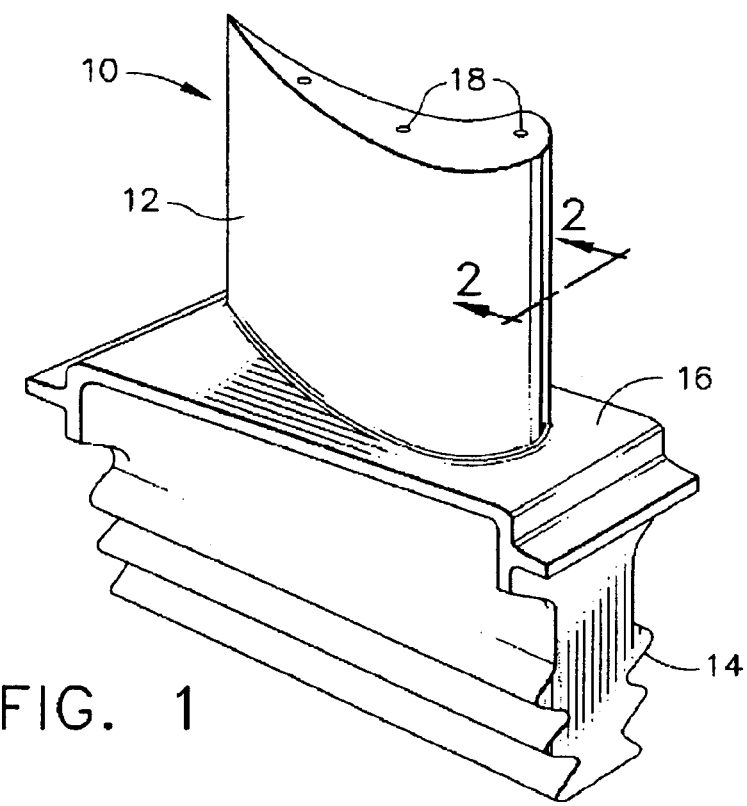
FIG. 1 is a perspective view of a high pressure turbine blade.

The present invention is generally applicable to components subjected to high temperatures, and particularly to components such as the high and low pressure turbine nozzles and blades, shrouds, combustor liners and augmentor hardware of gas turbine engines. An example of a high pressure turbine blade 10 is shown in FIG. 1. The blade 10 generally includes an airfoil 12 against which hot combustion gases are directed during operation of the gas turbine engine, and whose surface is therefore subjected to hot combustion gases as well as attack by oxidation, corrosion and erosion. The airfoil 12 is protected from its hostile operating environment by a thermal barrier coating (TBC) system schematically depicted in FIG. 2. The airfoil 12 is anchored to a turbine disk (not shown) with a dovetail 14 formed on a root section 16 of the blade 10. Cooling passages 18 are present in the airfoil 12 through which bleed air is forced to transfer heat from the blade 10. While the advantages of this invention are particularly desirable for high pressure turbine blades of the type shown in FIG. 1, the teachings of this invention are generally applicable to any component on which a thermal barrier coating may be used to protect the component from a high temperature environment.

Figure 2:
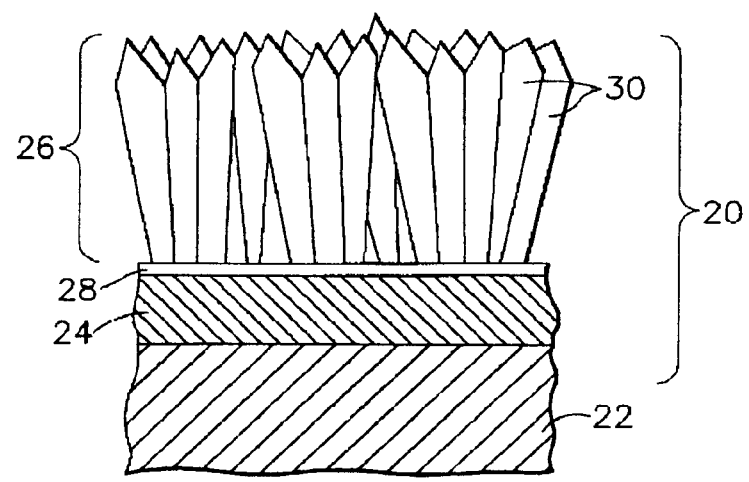
FIG. 2 schematically represents a cross-sectional view of the blade of FIG. 1 along line 2—2, and shows a thermal barrier coating system on the blade in accordance with a preferred embodiment of the invention.

The TBC system 20 is represented in FIG. 2 as including a metallic bond coat 24 that overlies the surface of a substrate 22, the latter of which is typically a superalloy and the base material of the blade 10. As is typical with TBC systems for components of gas turbine engines, the bond coat 24 is preferably an aluminum-rich composition, such as an overlay coating of an MCrAlX alloy or a diffusion coating such as a diffusion aluminide or a diffusion platinum aluminide of a type known in the art. Aluminum-rich bond coats of this type develop an aluminum oxide (alumina) scale 28, which is grown by oxidation of the bond coat 24. The alumina scale 28 chemically bonds a TBC 26, formed of a thermal-insulating material, to the bond coat 24 and substrate 22. The TBC 26 of FIG. 2 is represented as having a strain-tolerant microstructure of columnar grains 30. As known in the art, such columnar microstructures can be achieved by depositing the TBC 26 using a physical vapor deposition technique, such as EBPVD. The invention is also believed to be applicable to noncolumnar TBC deposited by such methods as plasma spraying, including air plasma spraying (APS). A TBC of this type is in the form of molten splats, resulting in a microstructure characterized by irregular flattened grains and a degree of inhomogeneity and porosity.

As with prior art TBC's, the TBC 26 of this invention is intended to be deposited to a thickness that is sufficient to provide the required thermal protection for the underlying substrate 22 and blade 10, generally on the order of about 75 to about 300 micrometers. According to the invention, the thermal-insulating material of the TBC 26 is based on binary yttria-stabilized zirconia (YSZ), but alloyed to contain niobia ($Nb_2O_3$) or titania ($TiO_2$) as an oxide additive. Each of these oxides has been shown by this invention to have a significant effect on the thermal conductivity of YSZ, particular YSZ containing about three to about four weight percent yttria. Based on an investigation discussed below, these oxides in an amount of up to ten weight percent of a YSZ coating is believed to have the beneficial effect of lowering the thermal conductivity of the coating. Particularly suitable amounts for these oxide additives are about 0.2 to about 8 weight percent niobia, or about 0.1 to about 4 weight percent titania.

In addition to exhibiting lower thermal conductivities, the modified YSZ TBC's of the invention have also shown to be more thermally stable than 7% YSZ, i.e., their conductivities do not increase over time to the extent that 7% YSZ does. As a result, YSZ TBC's of this invention enable gas turbine engine components to be designed for thinner TBC and/or, if applicable, lower cooling air flow rates, which reduces processing and material costs and promotes component life and engine efficiency.

In an investigation leading to this invention, TBC's were deposited by EBPVD on specimens formed of the superalloy René N5 on which a diffusion platinum aluminide bond coat had been deposited. Some of the specimens were buttons for the purpose of evaluating thermal cycle fatigue resistance, while others were in the form of pins for evaluating erosion and impact resistance. Some of each type of specimen were coated by evaporating an ingot of 7% YSZ (zirconia stabilized by about 7 wt. % yttria) to deposit a conventional 7% YSZ TBC. Other specimens were coated by co-evaporating separate ingots of approximately 3% YSZ and either niobia or titania. The TBC's were deposited to have thicknesses on the order of about 120 to about 170 micrometers. As a result of the deposition process, niobia and titania were uniformly deposited atom-by-atom throughout their respective YSZ TBCs, and not deposited as particles or concentrated in certain regions or layers of the coatings. Each of the TBCs consisted essentially of zirconia stabilized by about 3 to about 4 weight percent yttria, and one of the additional oxides of this invention in the following amounts: about 0.47 to about 1.15 weight percent niobia, or about 0.15 to about 1.0 weight percent titania.

The average thermal conductivities and densities of the TBC compositions are summarized in Table I below. Thermal conductivity is reported in the as-deposited condition and following a thermal aging treatment in which the specimens evaluated for conductivity were held at about 1200° C. for about two hours to determine the thermal stability of the coatings. [t1]

TABLE I

| Specimen (Coating) | Thermal Conductivity As-Deposited (W/mK) | Thermal Conductivity Aged (W/mK) | Change (%) | Density (g/cc) |
|---|---|---|---|---|
| 7% YSZ | 1.60 | 1.80 | 12.5 | 4.60 |
| YSZ + niobia | 1.55 | 1.67 | 7.7 | 4.74 |
| YSZ + titania | 1.36 | 1.46 | 7.4 | 4.22 |

The above results evidenced that the modified YSZ coatings containing niobia and titania in the amounts evaluated had significantly lower thermal conductivities than the industry standard 7% YSZ material, and were also significantly more thermally stable than 7% YSZ.

Impact and erosion tests were conducted on the pin specimens at high temperatures (about 1230° C.) and high gas velocities while subjected to an alumina powder injected into the gas stream. An alumina powder with an average particle size of about 50 micrometers was used to evaluate impact resistance using a gas stream velocity of about Mach 0.03, while an alumina powder with an average particle size of about 560 micrometers was used to evaluate erosion resistance using a gas stream velocity of about Mach 0.5. The specimens were rotated at a rate of about 500 rpm while subjected to the high velocity powder. Both erosion and impact resistance were measured in terms of the number of grams of erodent required to break through the thermal barrier coating to the underlying bond coat. The minimum and maximum erosion and impact resistances exhibited by the evaluated specimens are reported in Table II below. [t3]

TABLE II

| Specimen (Coating) | Erosion (grams) minimum | Erosion (grams) maximum | Impact (grams) minimum | Impact (grams) maximum |
|---|---|---|---|---|
| 7% YSZ | 900 | 1000 | 700 | 900 |
| YSZ + niobia | 1000 | 1000 | 800 | 1500 |
| YSZ + titania | 400 | 1100 | 800 | 1100 |

From the above, it can be seen that the TBC's alloyed with niobia exhibited essentially the same resistance to erosion as 7% YSZ, and all of the modified TBC's exhibited better impact resistance than 7% YSZ.

Furnace cycle tests (FCT) were performed on the button specimens using one-hour cycles to a temperature of about 2075° F. (about 1135° C.), and continued until about 10% spallation of the coating occurred. The 7% YSZ specimens exhibited an average life of about 500 cycles, while in comparison the YSZ+niobia and YSZ+titania specimens exhibited average FCT lives of about 673 and 570 cycles, respectively.

The tests reported above showed that a columnar YSZ TBC containing about three to four weight percent yttria and alloyed to contain about 0.4 to about 1.2 weight percent niobia or about 0.1 to about 1 weight percent titania exhibit improved thermal properties over conventional 7% YSZ coatings under hostile thermal conditions, while also exhibiting suitable resistance to impact, erosion and spallation. From these results, it was concluded that comparable results can be obtained for YSZ TBC containing up to ten weight percent yttria and either about 0.2 to about 8 niobia, or about 0.1 to about 4 titania, with additions of up to ten weight percent of niobia and/or titania being possible.

While the invention has been described in terms of a preferred embodiment, it is apparent that other forms could be adopted by one skilled in the art. Accordingly, the scope of the invention is to be limited only by the following claims.

What is claimed is:

1. A component having a coating on a surface thereof, the coating consisting essentially of yttria-stabilized zirconia and to which is alloyed an oxide additive chosen from the group consisting of niobia and up to about four weight percent titania.

2. A component according to claim 1, wherein the oxide additive is niobia and is present in the coating in an amount of up to ten weight percent.

3. A component according to claim 1, wherein the oxide additive is niobia and is present in the coating in an amount of about 0.2 to about 8 weight percent.

4. A component according to claim 1, wherein the oxide additive is titania.

5. A component according to claim 1, wherein the oxide additive is titania and is present in the coating in an amount of about 0.1 to about 4 weight percent.

6. A component according to claim 1, wherein the coating contains up to ten weight percent of niobia and titania combined.

7. A component according to claim 1, wherein the coating contains about three to about four weight percent of yttria.

8. A component according to claim 1, wherein the coating consists of zirconia, yttria, and the oxide additive.

9. A component according to claim 1, further comprising a metallic bond coat adhering the coating to the component.

10. A component according to claim 9, wherein the metallic bond coat is a diffusion platinum aluminide.

11. A component according to claim 1, wherein the component is a superalloy airfoil component of a gas turbine engine.

12. A gas turbine engine component comprising:
 a superalloy substrate;
 a metallic bond coat on a surface of the substrate; and
 a thermal barrier coating having a columnar microstructure, the thermal barrier coating consisting essentially of zirconia partially stabilized by about three to about ten weight percent yttria, the thermal barrier coating further containing an oxide additive chosen from the group consisting of up to ten weight percent niobia and up to about four weight percent titania.

13. A gas turbine engine component according to claim 12, wherein the oxide additive is niobia and is present in the coating in an amount of about 0.2 to about 8 weight percent.

14. A gas turbine engine component according to claim 13, wherein the coating consists of zirconia, yttria, and niobia.

15. A gas turbine engine component according to claim 12, wherein the oxide additive is titania and is present in the coating in an amount of about 0.1 to about 4 weight percent.

16. A gas turbine engine component according to claim 15, wherein the coating consists of zirconia, yttria, and titania.

17. A gas turbine engine component according to claim 12, wherein the coating consists of zirconia, yttria, and the oxide additive.

18. A gas turbine engine component according to claim 12, wherein the metallic bond coat is a diffusion platinum aluminide.

19. A gas turbine engine component according to claim 12, wherein the coating contains about three to about four weight percent of yttria.

20. A gas turbine engine component according to claim 12, wherein the component is an airfoil component.

* * * * *